Oct. 22, 1940.　　　L. W. WILLIAMS　　　2,218,800
FILTER
Filed Nov. 5, 1937　　　2 Sheets-Sheet 1

INVENTOR
Lewis W. Williams
BY Kenyon & Kenyon
ATTORNEYS

Oct. 22, 1940.  L. W. WILLIAMS  2,218,800
FILTER
Filed Nov. 5, 1937  2 Sheets-Sheet 2

INVENTOR
Lewis W. Williams
BY Kenyon & Kenyon
ATTORNEYS

Patented Oct. 22, 1940

2,218,800

UNITED STATES PATENT OFFICE 2,218,800

FILTER

Lewis W. Williams, Short Hills, N. J., assignor to Motor Improvements, Inc., Newark, N. J., a corporation of Delaware Application November 5, 1937, Serial No. 172,982

6 Claims. (Cl. 210—164)

This invention relates to filters and more especially to filters particularly adapted for cleaning the lubricant of an internal combustion engine.

An object of this invention is a filter of this type which is simple in construction, inexpensive to manufacture and is efficient in operation over a long period of time.

In a filter embodying the invention, the filtering unit consists of a length of metal mesh having its ends brought together and fastened in any suitable manner. A length of the filtering material such, for example, as filter paper overlies said metal mesh with its longitudinal edges folded around the edges of the metal mesh. The metal mesh and filtering material are infolded to form flanges radially arranged with respect to a resulting tubular passage, thereby securely clamping the folded-over edges of the filtering material. A ring or the like preferably surrounds the filtering unit with infolded portions engaging the flanges to reinforce the unit and prevent distortion of the flanges. The ends of the filtering unit are provided with closures and means are provided for supplying oil to be filtered to the exterior of the filtering unit while means are provided for discharging filtered oil from the interior of the unit.

Other objects, novel features and advantages of this invention will become apparent from the following specification and accompanying drawings, wherein.

Figure 1:
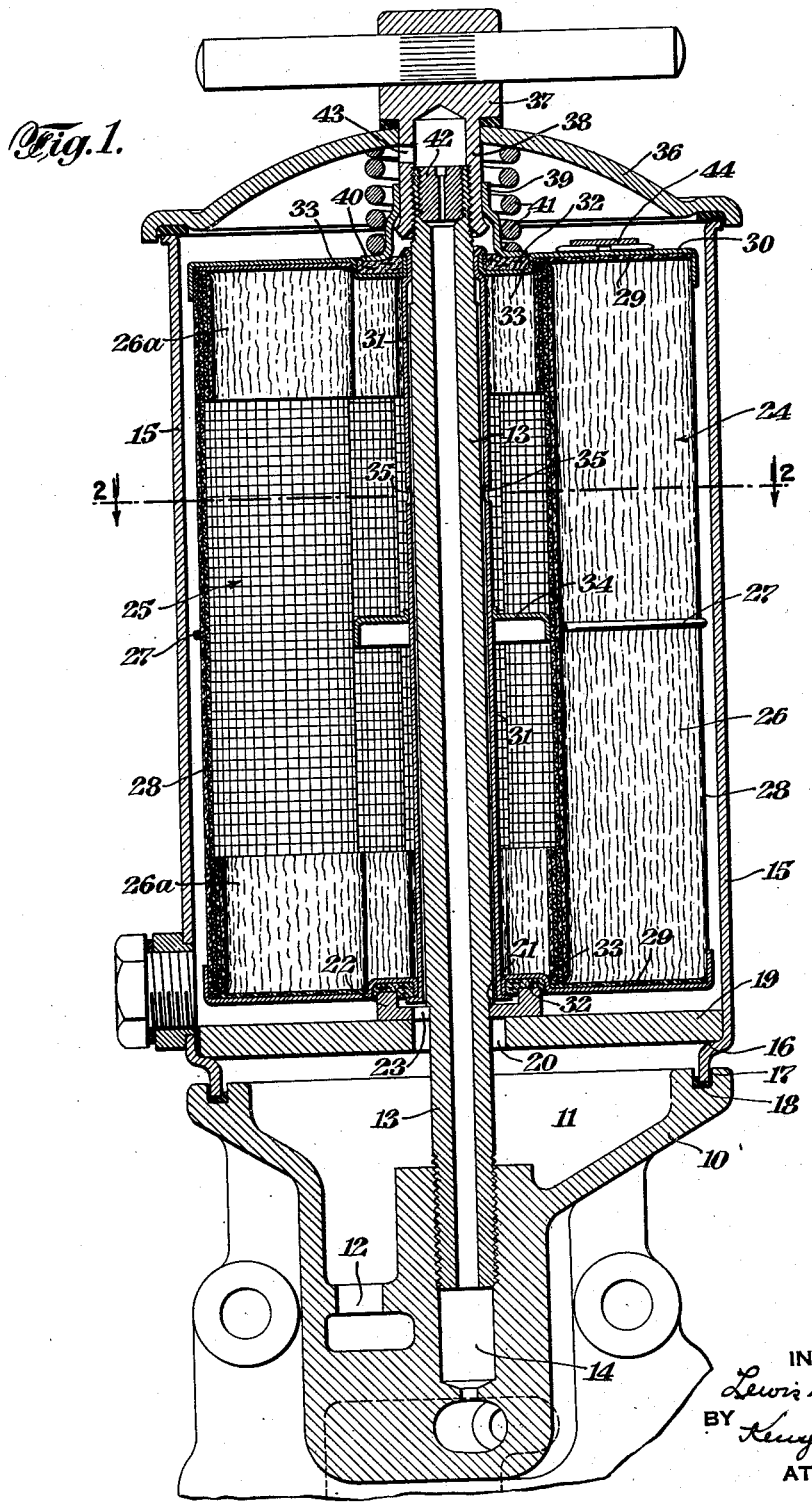
Fig. 1 is a vertical section through a filter embodying the invention.
Figure 2:
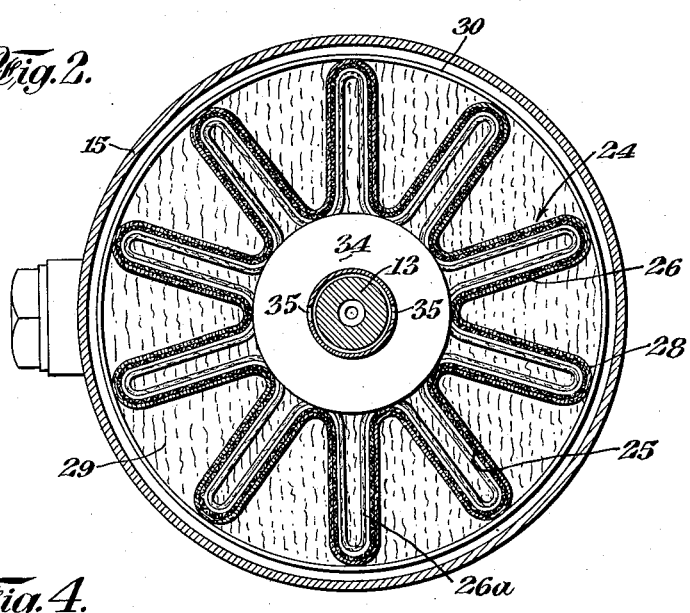
Fig. 2 is a section on the line 2—2 of Fig. 1.
Figure 4:
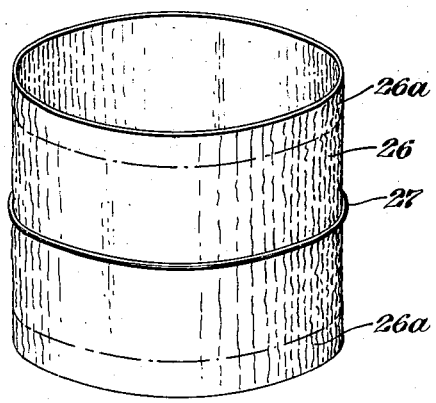
Fig. 4 is a similar view of the filter paper cylinder with the reinforcing ring surrounding it.
Figure 5:
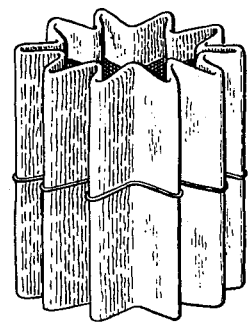
Fig. 5 is a perspective view of a partially folded filtering unit.
Figure 3:
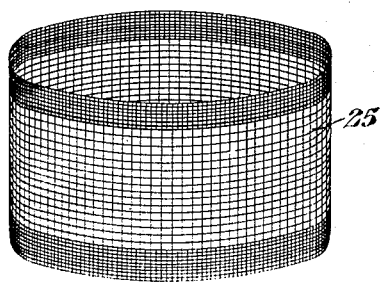
Fig. 3 is a perspective view of the mesh cylinder before assembly with the filter paper.
Figure 6:
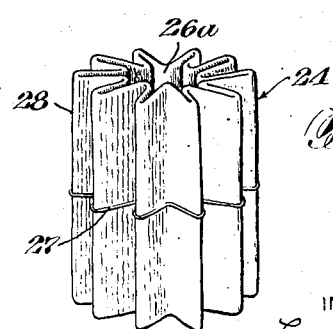
Fig. 6 is a perspective view of a fully folded filtering unit.

A base 10 is provided with a sump 11 from which filtered oil escapes through the outlet 12. A hollow post 13 has its lower end threaded and screwed into a threaded bore 14 in the base, said bore constituting the inlet for the oil to be filtered. A cylindrical shell 15 is offset near its lower end to provide an inner shoulder 16 and the bottom edge of the shell fits into a groove 17 in the base, a gasket 18 being interposed between the bottom rim of the shoulder and the bottom of the groove. A metal disk 19 rests on the shoulder 16 and is provided with a central aperture 20 through which the post 13 extends, the aperture being of larger diameter than the post. The lower portion of the post 13 is of smaller diameter than the upper portion to form a shoulder 21, against which is fitted a washer 22 which rests on the disk 19 and snugly fits the smaller diameter portion of the post 13. In the washer 22 is provided a notch 23 which permits passage of filtered oil downwardly along the post 13 into the sump 11. The washer 22, disk 19 and post 13 cooperate to clamp the shell 15 to the base 10. A filtering unit 24 is arranged within the shell 15 and is provided with a central passageway through which the post 13 extends. This filtering unit consists of a length of wire mesh 25, the ends of which are brought together and fastened in any desired manner. A length of suitable filtering material 26, such, for example, as filter paper, overlies the mesh 25 and the mesh and paper, overlies the mesh 25 and the mesh and filtering material are infolded to form flanges extending radially from a central passage. In the manufacture of the filtering element, the wire screen is first formed into a cylinder as shown in Fig. 3 with the edges bent back to form a smooth periphery for each end of the cylinder. The length of filtering material 26 is formed into the cylinder shown in Fig. 4 and is arranged around the cylinder 25 and its edges are folded over the edges of the cylinder. Preferably a wire ring 27 is assembled with the two cylinders exterior of the cylinder 26, but this ring may be applied later, if desired. The assembly just described is then subjected to pressure simultaneously applied to spaced lines to force sections inwardly, thereby forming radially extending flanges 28, each consisting of two sections of the wire mesh and filter paper forming a channel leading into the central cylindrical passageway. The wire 27 is simultaneously formed to snugly fit the flanges and reinforce the same against distortion. The two wire sections of each flange are slightly spaced one from the other due to the double thickness of filter paper interposed between the edges of such sections, such double thickness constituting the folded edges 26a of the strip 26.

Across each end of the filtering unit is provided a disk 29 of blotting paper which is held against the end of the unit by a cap 30. A tube 31 extends through the central passage of the filter unit and is attached at each end to one of the caps 29. Each cap is offset inwardly to provide a recess to receive a gasket 32 and such offset is of proper diameter that its periphery 33 is engaged by the inner ends of the flanges 28.

A disk 34 is supported by the tube 30 centrally of its ends and is of proper diameter to have its periphery engaged by the inner ends of the flanges 28. The tube 31 surrounds the post 13 and is of slightly larger diameter than the post to provide an oil passage between the tube and post and the tube is provided with apertures 35.

A cover 36 rests upon the top rim of the shell 15 and a nut 37 is rotatably supported thereby, the nut 32 having a hollow boss 38 extending through the cover. A sleeve 39 is slidably mounted on the boss 38 and has a flange 40 between which and the cover 36 is interposed a spring 41. The boss 38 is interiorly threaded to receive the threaded upper end of the post 13 whereby the cover is clamped to the shell. The flange 40 engages the gasket 32 in the upper cap 30 while the washer 22 has an upstanding rim which engages the gasket 32 in the bottom cap 30.

Oil to be filtered is supplied to the inlet 14 and passes upwardly through the post 13 in the top of which is arranged a plug 42 having an orifice of predetermined size to determine the rate of flow through the filter. After the oil passes through the orifice 42, it flows through an aperture 43 in the boss 38 and fills the space between the filtering unit 24 and shell 15. The oil then passes inwardly through the filtering material and flows by way of the channels in the flanges into the central passageway of the filtering unit. From this passageway the oil escapes through the apertures 35 and flows downwardly between the post 13 and tube 31 through the notch 23 and apertures 20 into the sump 11 from which it is discharged through the outlet 12.

A new filtering unit may be substituted for a used unit merely by removing the cover 36, lifting out the used filtering unit by means of the handle 44 provided for that purpose, inserting the new unit and replacing the cover. The spring 41 insures proper setting of the flange 40 and the washer 22 in their co-operating gaskets 32 to produce a tight seal. The shell 15 may be removed by unscrewing the post 13 and lifting it out, thus releasing the disk 19.

The ring 21 may be applied to the filtering unit after the flanges have been formed instead of before, if desired. In such event, the ring is separately formed into the proper shape and then slipped over the unit before the disks 29 and caps 30 are applied. The ring 21 reinforces the filtering unit against distortion of the flanges but is not essential to the operation of the unit and in certain circumstances may be omitted. Also, if desired, more than one such ring may be used.

I claim:

1. A filter comprising a base, a post threaded into said base, a shell having an inner shoulder, a disk engaging said shoulder and having an aperture through which passes said post, a collar carried by said post and holding said disk in position to clamp said shell to said base, a filtering unit within said shell having one end resting on said collar and having a central bore through which extends said post, a cover for said shell, interengaging means on said cover and post for clamping said cover to said shell, and spring-pressed means carried by said cover for engaging the opposite end of said filtering unit to retain said filtering unit between it and said collar.

2. A filter according to claim 1, wherein said post is hollow and discharges oil into the space between the shell and the filtering unit and an outlet is provided from the interior of the filtering unit through said disk and collar.

3. A filtering unit comprising an endless strip of wire mesh infolded to form flanges extending radially from a central tubular passage and a length of filtering material contacting the outer face of said wire mesh and having its edges folded over the edges of said mesh into contact with the inner face of said mesh, the portions of the filtering material extending over the ends of the flange walls into each flange being in contact to space said flange walls, a cap closing each end of said unit and a tube extending through said central portion and having each end joined to a cap.

4. A filtering unit comprising an endless strip of wire mesh infolded to form flanges extending radially from a central tubular passage, a length of filtering material contacting the outer face of said wire mesh and having its edges folded over the edges of said mesh into contact with the inner face of said mesh, the portions of the filtering material extending over the ends of the flange walls into each flange being in contact to space said flange walls, a cap closing each end of said unit and a tube extending through said central portion and having each end joined to a cap, each cap having an offset portion engaged by the inner ends of said flanges.

5. A filtering unit comprising an endless strip of wire mesh infolded to form parallel wall hollow flanges extending radially from a central tubular passage and a length of filtering material contacting the outer face of said wire mesh and having its edges folded over the edges of said mesh into contact with the inner face of said mesh, the portions of the filtering material extending over the ends of the flange walls into each flange being in contact to space said flange walls.

6. The method of making a filter which comprises assembling a cylinder of filtering material on a wire mesh cylinder, folding the ends of the filtering material cylinder inwardly over the ends of the wire mesh cylinder, and applying inwardly directed pressure to the exterior surface of said assembly along spaced lines parallel to the cylinder axis to produce radially arranged parallel wall pockets communicating with a central tubular passage and having their walls spaced by contacting portions of the filtering material.

LEWIS W. WILLIAMS.